(12) United States Patent
Wei et al.

(10) Patent No.: US 11,769,035 B1
(45) Date of Patent: Sep. 26, 2023

(54) AUTOMATICALLY DETERMINING CONFIGURATIONS FOR EXECUTING RECURRENT NEURAL NETWORKS

(71) Applicant: Amazon Technologies, Inc., Seattle, WA (US)

(72) Inventors: Lai Wei, Menlo Park, CA (US); Hagay Lupesko, San Mateo, CA (US); Anirudh Acharya, San Jose, CA (US); Ankit Khedia, Redwood City, CA (US); Sandeep Krishnamurthy, Santa Clara, CA (US); Cheng-Che Lee, Mountain View, CA (US); Kalyanee Shriram Chendke, Cupertino, CA (US); Vandana Kannan, Santa Clara, CA (US); Roshani Nagmote, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1,322 days.

(21) Appl. No.: 16/219,751

(22) Filed: Dec. 13, 2018

(51) Int. Cl.
*G06N 3/04* (2023.01)
*G06N 3/08* (2023.01)

(52) U.S. Cl.
CPC ... *G06N 3/04* (2013.01); *G06N 3/08* (2013.01)

(58) Field of Classification Search
CPC .................................. G06N 3/04; G06N 3/08
See application file for complete search history.

(56) References Cited

U.S. PATENT DOCUMENTS

| | | | |
|---|---|---|---|
| 11,256,990 B2* | 2/2022 | Lanctot et al. | G06N 3/084 |
| 2016/0099010 A1* | 4/2016 | Sainath et al. | G10L 25/30 |
| | | | 704/232 |

(Continued)

OTHER PUBLICATIONS

Narwekar, Pampari, University of Illinois, RNN - Architecture (Year: 2016) and Pages 1-124.*
Alom, Md Zahangir, et al. "Effective quantization approaches for recurrent neural networks." 2018 international joint conference on neural networks (IJCNN). IEEE, 2018. (Year: 2018).*

* cited by examiner

*Primary Examiner* — Daniel T Pellett
(74) *Attorney, Agent, or Firm* — NICHOLSON DE VOS WEBSTER & ELLIOTT LLP

(57) ABSTRACT

Techniques are described automatically determining runtime configurations used to execute recurrent neural networks (RNNs) for training or inference. One such configuration involves determining whether to execute an RNN in a looped, or "rolled," execution pattern or in a non-looped, or "unrolled," execution pattern. Execution of an RNN using a rolled execution pattern generally consumes less memory resources than execution using an unrolled execution pattern, whereas execution of an RNN using an unrolled execution pattern typically executes faster. The configuration choice thus involves a time-memory tradeoff that can significantly affect the performance of the RNN execution. This determination is made automatically by a machine learning (ML) runtime by analyzing various factors such as, for example, a type of RNN being executed, the network structure of the RNN, characteristics of the input data to the RNN, an amount of computing resources available, and so forth.

20 Claims, 9 Drawing Sheets

(56) References Cited

U.S. PATENT DOCUMENTS

2017/0308808 A1* 10/2017 Kobylkin .......... G06Q 30/0202
2018/0322385 A1* 11/2018 Yehezkel Rohekar et al. ............
G06N 7/005

AUTOMATICALLY DETERMINING CONFIGURATIONS FOR EXECUTING RECURRENT NEURAL NETWORKS

BACKGROUND

Recurrent neural networks (RNNs) are a popular type of machine learning (ML) technique for many types of ML problems. RNNs can be particularly useful, for example, when processing sequential information such as text, speech, and time-series data, where the ability to predict a next element can be vastly improved if information about previous elements is factored in. The efficient use of RNNs however often depends on several configuration choices related to executing the RNNs in a runtime environment, the proper selection of which can be challenging and error-prone.

BRIEF DESCRIPTION OF DRAWINGS

Various embodiments in accordance with the present disclosure will be described with reference to the drawings, in which.

DETAILED DESCRIPTION

Figure 1:
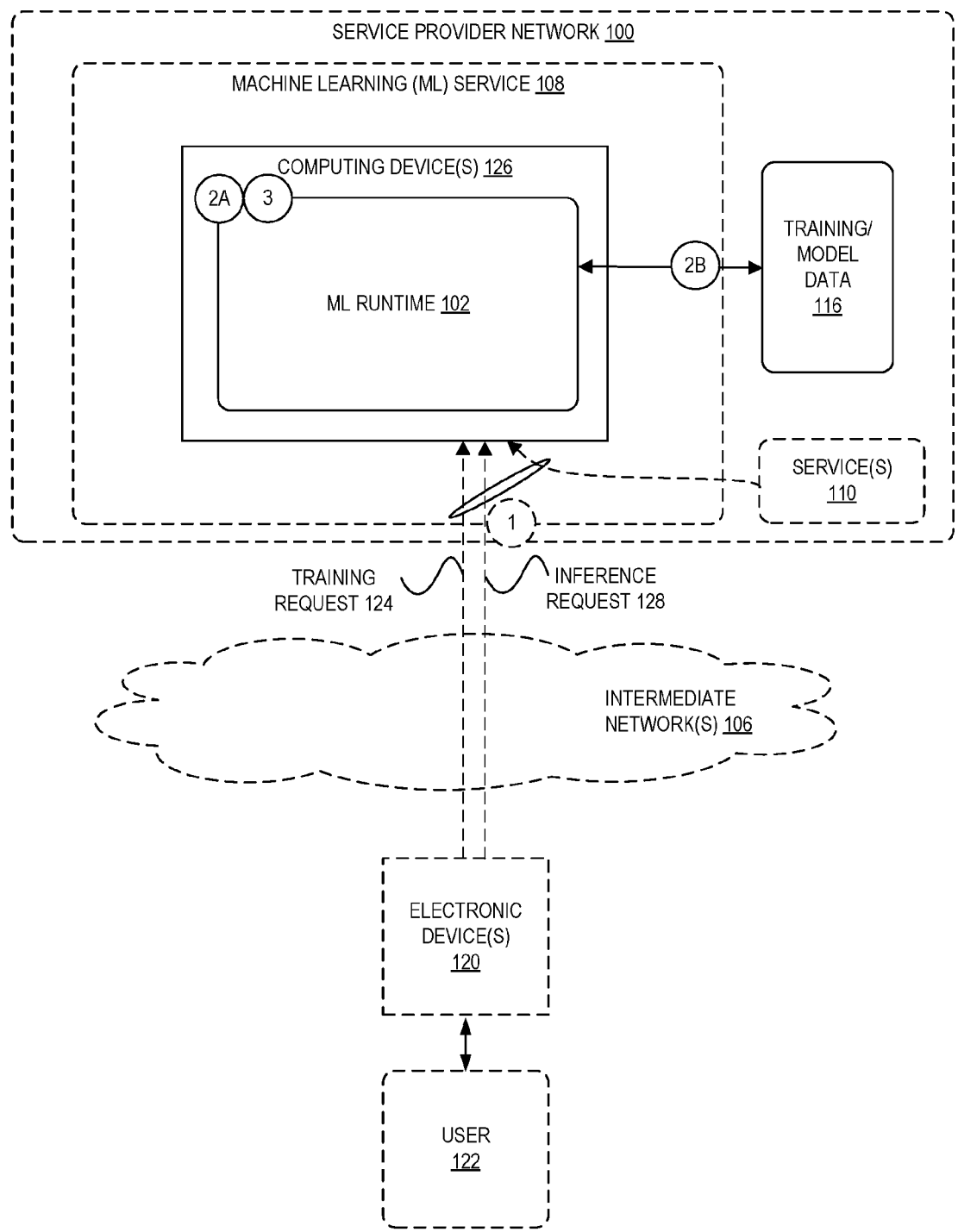
FIG. 1 is a diagram illustrating an exemplary environment for automatically determining one or more runtime configurations used to execute recurrent neural networks (RNNs) for training or inference according to some embodiments.

Various embodiments of methods, apparatus, systems, and non-transitory computer-readable storage media are described for automatically determining one or more runtime configurations used to execute recurrent neural networks (RNNs) for training or inference. According to some embodiments, one such configuration choice involves determining whether to execute an RNN in a looped, or "rolled," execution pattern or in a non-looped, or "unrolled," execution pattern. Execution of an RNN using a rolled execution pattern generally consumes less memory resources than execution using an unrolled execution pattern, whereas execution of an RNN using an unrolled execution pattern typically executes faster. Thus, the configuration choice involves a time-memory tradeoff that can significantly affect the performance of the RNN execution depending on the computing resources available. According to embodiments, this determination can be made automatically by a machine learning (ML) runtime by analyzing various factors such as, for example, a type of RNN being executed, the network structure of the RNN, characteristics of the input data to the RNN, an amount of computing resources available at one or more computing devices at which the RNN is to be executed, and so forth. The ability to automatically determine an execution pattern for an RNN, among other possible configuration options, alleviates data scientists and other users from the cumbersome and error-prone process of choosing optimal configuration settings for any particular RNN in dynamic computing environments.

A neural network is a framework for processing complex data inputs and which can "learn" to make decisions or perform tasks by considering examples. In general, a neural network is able to make decisions or perform tasks without being programmed with task-specific rules. In the context of image recognition, for example, a neural network can be trained to identify images containing a specified item by analyzing example images that have been labeled as either containing the item or not. A neural network generally comprises a set of connected nodes, or "neurons," each of which can transmit a signal from one node to another. The signal, for example, can be a real number where the value is computed by a non-linear function of the sum its inputs. The set of connected nodes of a neural network are typically organized into a set of layers, where each layer may perform different kinds of transformations on its inputs.

One type of neural network, commonly referred to as a "feedforward" network, comprises a graph of nodes that do not form any cycles. Due to the acyclic nature of such networks, data input to a feedforward network generally moves in only one direction from a set of input nodes, through one or more sets of nodes forming hidden layers, and to a set of output nodes.

Another type of neural network is a recurrent neural network (RNN), comprising a graph of nodes that includes cycles. In contrast to feedforward networks, an RNN can calculate and maintain an internal state used to process sequences of inputs. In general, execution of an RNN involves iterating over an input data sequence, where each iteration uses as input the next available item of input data from the input data sequence and the output of the previous iteration. The ability to maintain such internal state during execution makes RNNs particularly suitable for tasks such as speech recognition and handwriting recognition, time series prediction, and many other problems involving sequential data sets. There are several different types of RNNs each defined by different network structures such as, for example, long short-term memory (LSTM) networks, gated recurrent unit (GRU) networks, and bidirectional RNNs.

When a user desires to execute an RNN, either for training or to perform inference, there are various user-selectable parameters and configurations related to execution of the RNN that affect execution performance. For example, one such configuration choice is whether to "unroll" the RNN for execution. As indicated above, executing an RNN generally involves an iterative process of taking a next item of input data and the output of the previous iteration as input to the network until no additional input data is available. As implemented in code by a ML runtime, for example, a "for loop" construct might be used to cause the runtime to repeatedly execute the process described above on all available input data. Executing an RNN in this manner can be efficient in terms of memory use since only the data needed to calculate each current iteration needs to be present in memory (for example, a single copy of the network structure, current network state, and current input data item). The looped execution of RNNs however involves the processing of conditional statements and branching (for example, to determine when the iterative process is complete), which can be particularly expensive when executing on graphical processing units (GPUs) and other types of hardware and can thus increase execution time.

Another option is to expand or "unroll" the execution of an RNN such that copies of the RNN structure are created and some or all of the iterations are processed as a non-looped sequence based on the input data. The creation of copies of the network generally consumes more memory during execution while execution time is improved due to the lack of conditional statements and branching to be processed in the non-looped execution pattern. Data scientists and other users typically make the decision of whether to execute an RNN in a looped or non-looped fashion based on their experience and any information they might be able to gather related to the RNN and currently available computing resources. However, it is often difficult and error-prone to make this decision manually each time an RNN is executed. Embodiments herein describe a system for automatically determining such RNN execution configurations, thereby improving the performance of RNN executions for training or inference purposes.

FIG. 1 is a diagram illustrating an exemplary environment for automatically determining one or more runtime configurations used to execute RNNs for training or inference according to some embodiments. In FIG. 1, a ML runtime 102—which may be implemented as software, hardware, or combinations thereof—may be part of a ML service 108, which could be implemented in a service provider network 100. In other embodiments, the ML runtime 102 executes on a computing device (for example, a server, desktop computer, mobile device, tablet computer, and the like) that is part of or external to a service provider network 100.

A service provider network 100 provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, and so forth. These and other computing resources may be provided as services, such as a hardware virtualization service that can execute compute instances, a storage service that can store data objects, and so forth. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (for example, the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

According to embodiments described herein, a system automatically determines whether to unroll an RNN during training or inference, among other possible configuration choices that can be automatically determined. In some embodiments, the automatic determination is made by a ML runtime 102 that determines whether to execute an RNN using an unrolled execution pattern or not based on any number of factors including, but not limited to, how much input data is expected, characteristics of the input data, available computing resource capacity at the computing devices upon which the RNN is to be executed (for example, in terms of CPU, GPU, memory capacity), and the complexity of the RNN structure.

In one embodiment, the ML runtime 102 is implemented in whole or in part within a ML service 108 for training and using RNNs (and possibly other types of ML models). As is described elsewhere herein, a ML service 108 allows entities (for example, other services of the service provider network 100, or users of the service provider network 100) to train machine learning models and execute machine models as a service, such as via use of Hypertext Transfer Protocol (HTTP) requests issued to an endpoint associated with the ML service 108 (for example, in a provider network 100). For example, at optional circle labeled "1" in FIG. 1, an electronic device 120 operated by a user 122, or another service 110 (or any other application or system) internal or external to the service provider network 100, can issue a training request 124 or an inference request 128 to execute models using a ML runtime 102.

In some embodiments, a training request 124 or an inference request 128 can include one or more parameters indicating preferences for execution of the RNN. For example, a user can provide input indicating a relative importance of memory consumption compared to execution time, where the provided input can be used as part of the determination to unroll the RNN or not during execution, as described herein. In some embodiments, a user can specify thresholds the user desires execution of the RNN to stay within (for example, a user might desire execution of the RNN to not consume more than 90% of available memory resources, or desire that execution not exceed a specified time threshold). In other examples, a user can specify a relative weighting towards memory or execution time, for example, as based on a slider with memory represented by one endpoint and execution time represented by the other.

In an embodiment, execution of an RNN is based on model data representing the RNN and data used as input to the execution (for example, training data or data used to perform inference). In an embodiment, the input/model data 116 is stored within a service provider network 100 (for example, at a storage location provided by the ML service 108, or at a separate storage service of the service provider network 100) or outside of the service provider network, and may be identified in the request to execute the RNN (for example, using a URL). In other embodiments, the input data and/or model data is stored at a storage location external to the service provider network 100. The data representing an RNN can be stored using any of various formats for representing the network structure usable by the ML runtime 102 (for example, as Extensible Markup Language (XML) data, using databases, binary data formats, and the like). The input data generally can be any type of sequential data or other data usable by an RNN including, for example, speech data, financial data, inventory data, data indicating computing resource performance, and so forth.

In an embodiment, at circle "2A," the ML runtime 102 processes the request to execute the RNN, including obtaining the input/model data 116 and, optionally, analyzing the input data and/or model data to be used to execute the RNN. As indicated above, the input/model data 116 can be obtained from any storage location accessible to the ML runtime 102.

In one embodiment, analysis of the input data can include determining various characteristics of the input data that can potentially affect execution performance of the RNN. As one example, the ML runtime 102 can determine one or more data types associated with the input data, where certain computing environments may have optimizations for certain data types. Some types of computing environments, for example, may include optimizations for processing half-precision floating-point formatted data (16-bit floating point formats) or single-precision floating-point formatted data (32-bit floating point formats) and thus a determination of the presence of such data types in the input data can be used as part of the execution determination. As another example, some computing environments include optimizations for processing sparse data and thus a determination of whether the input data includes sparse data can be factored into the execution pattern determination.

In an embodiment, analysis of the model data can include determining a type of RNN to be executed and information about the network structure of the RNN. The type of RNN, for example, can be any of a fully recurrent network, a recursive neural network, a long short-term memory (LSTM) network, a gated recurrent unit (GRU) network, and a bidirectional RNN, a continuous time RNN (CTRNN), a hierarchical RNN, or a recurrent multilayer perceptron network, and so forth. In some embodiments, the type of RNN can be specified in the request 124 or 128 or, in other examples, determined by the ML runtime 102 by analyzing the model data. Information about the network structure can include, for example, a number of nodes in each layer of the RNN, a number of layers, values for various hyperparameters associated with the RNN, and so forth. The information about the network structure similarly can be specified as part of the request 124 or 128 or, in other examples, determined by the ML runtime 102 by analyzing the model data, or combinations thereof. Some types of RNNs typically use more memory than others during execution, and RNNs with more nodes and layers generally use more memory than those with fewer nodes and layers, and thus this information can be useful in the execution pattern determination depending on an amount of available computing resources.

In an embodiment, at circle "2B," the ML runtime 102 obtains information about computing resources available at the computing device(s) 126 at which the RNN is to execute. For example, the ML runtime 102 can obtain computing resource information from the computing device itself (for example, by querying a hypervisor, VM, or other application running on the computing device(s) 126), or from an external service to which the computing device(s) report computing resource information (for example, a data monitoring service of the service provider network 100). In an embodiment, the computing resource information can include information indicating an amount of currently available resources for each of one or more resource types including, for example, CPU, GPU, memory, and so forth.

In an embodiment, information about the computing resources can further include various types of optimizations provided by the computing resources at which the RNN is to be executed, for example, optimizations for processing certain types of data as described above. This information can be used in combination with information about types of data present in the training data or data used to perform inference to better estimate performance demands. In an embodiment, the computing resource information can further include information about software running on the computing device(s) at which the RNN is to be executed including, for example, information about operating systems, hypervisors, VMs, other applications, VMs and workloads associated with other users running on the same computing device(s), and so forth.

In an embodiment, at circle "3," the ML runtime 102 determines an execution pattern for the RNN and executes the RNN based on the obtained input data. For example, the ML runtime 102 can determine the execution pattern based on some or all of the information obtained by the runtime at circles "2A" and 2B" above. As indicated above, the determination of whether to execute an RNN using an unrolled execution pattern or not involves an inherent time-memory trade-off problem where, if enough memory is available, an unrolled execution pattern can result in faster execution. In contrast, if the execution is being performed on a computing device with more limited memory resources, a rolled execution pattern can be used at the expense of increased execution time.

Figure 2:
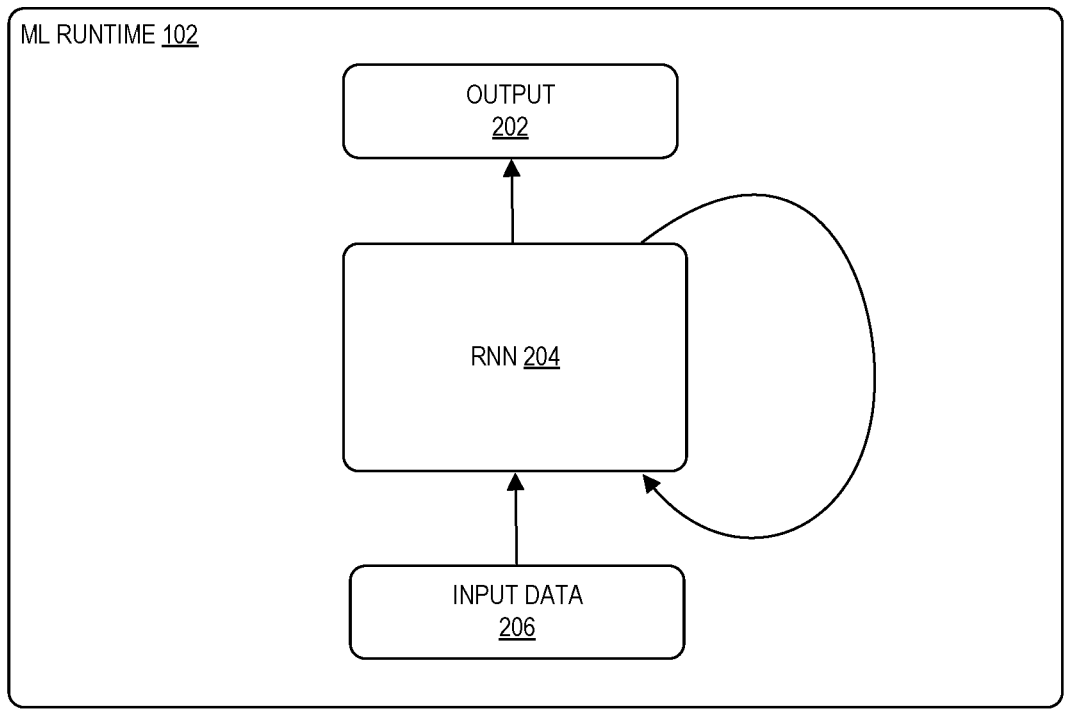
FIG. 2 is a diagram illustrating an example of executing an RNN using a looped, or "rolled," execution pattern according to some embodiments.

FIG. 2 illustrates an example of executing an RNN using a looped, or "rolled," execution pattern according to some embodiments. As shown in FIG. 2, a ML runtime 102 executes an RNN 204 based on input data 206. During execution using a rolled execution pattern, the ML runtime 102 can maintain a single or small number of copies of the data representing the RNN 204 (for example, data representing the nodes, weights, and other aspects of the network), where each iteration of the execution takes a next item of input data 206, calculates a current state of the RNN 204 using the input data in combination with the previous state (as indicated by the loop connecting the RNN 204 to itself), and generating output 202. During training, the output 202 can be compared to actual output and an error can be generated, and this error can be backpropagated to the RNN 204 to train the RNN 204. During inference, the output 202 can represent the result of executing the RNN 204.

Figure 3:
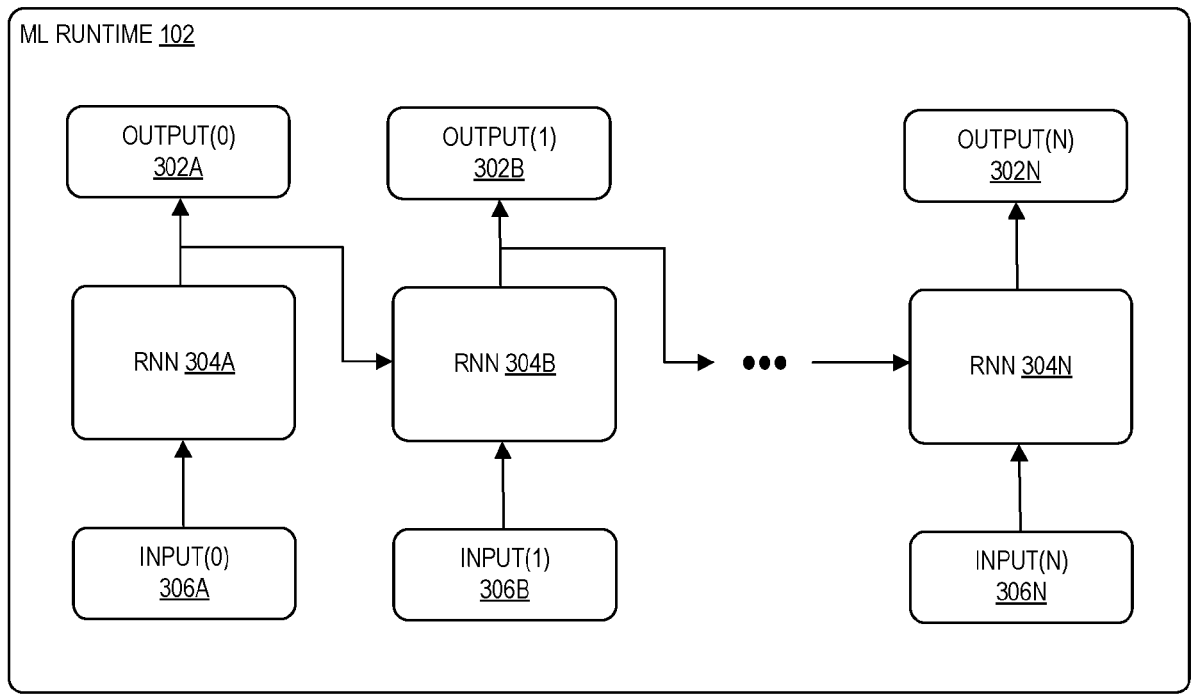
FIG. 3 is a diagram illustrating an example of executing an RNN using a non-looped, or "unrolled," execution pattern according to some embodiments.

FIG. 3 illustrates an example of executing an RNN using a non-looped, or "unrolled," execution pattern according to some embodiments. As shown in FIG. 3, a ML runtime 102 executes an RNN (illustrated as RNN 304A-304N, each representing a copy of a same RNN network structure) based on input data 306A-306N (each representing, for example, an item of input data from an input data sequence used to train or perform inference using the RNN). The execution of an RNN using an unrolled or non-looped execution pattern, as illustrated in FIG. 3, can involve creating copies of the RNN network structure (represented by RNNs 304A-304N) and executing the RNN in a sequence using a next item of input data (one of inputs 306A-306N) and the output from the preceding copy of the RNN, thereby generating a set of outputs 302A-302N. As indicated above, the creation of the copies of the RNN network structure and executing those copies as a sequence can improve execution time at the cost of memory used to store the copies of the network structure.

In some embodiments, the selection of an execution pattern can be based one or more thresholds associated with available computing resources. For example, based on default thresholds or based on user specification of one or more thresholds as described above, the ML runtime 102 may select an execution pattern by determining whether the execution of the RNN is likely to exceed one or more of the defined thresholds. The determination, for example, can be based on estimating an amount of computing resources execution of an RNN is to use based on the characteristics of the RNN, amount of input data, and possibly other factors. In this example, an appropriate execution pattern can be selected to minimize the likelihood of a threshold being exceeded.

In one embodiment, a separate ML model is trained on based on performance data related to execution of different types of RNNs, based different input data sizes, and using variable amounts of computing capacity, and used to determine execution patterns for future RNN executions. For example, RNN execution performance data in combination with information about whether the execution was performed in an unrolled fashion or not can be used to train the model to select an execution pattern optimizing either memory usage or execution time.

Figure 4:
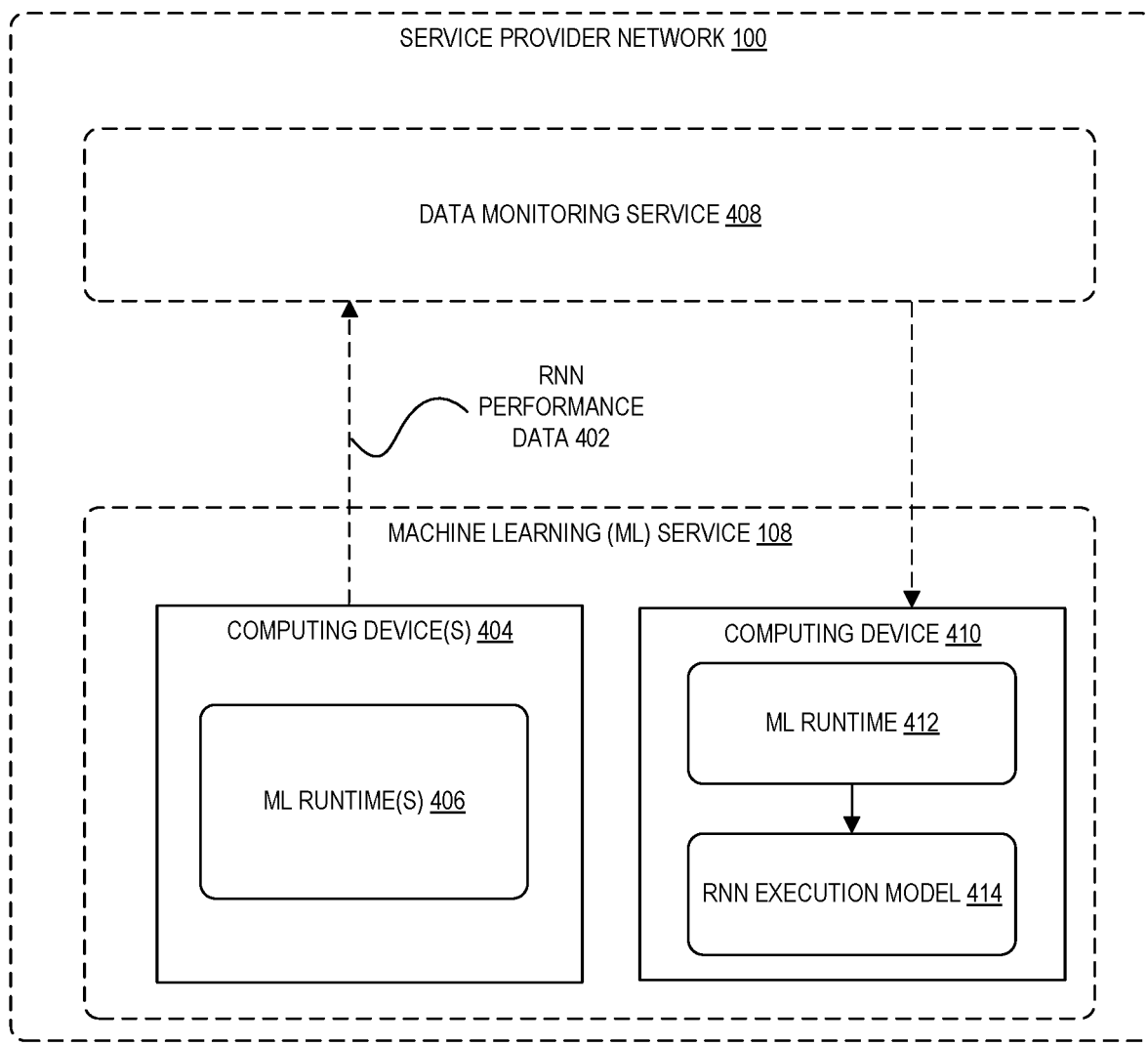
FIG. 4 is a diagram illustrating an environment for training a machine learning (ML) model used to determine whether to execute an RNN using a rolled or unrolled execution pattern according to some embodiments.

FIG. 4 is a diagram illustrating an exemplary environment for training a ML model used to determine whether to execute an RNN using a looped or non-looped execution pattern according to some embodiments. As shown in FIG. 4, RNN performance data 402 is obtained from computing device(s) 404 at which ML runtimes 406 execute RNNs under various conditions, as indicated above. In some embodiments, the performance data 402 can be sent to a data monitoring service 408 of a service provider network or, in other embodiments, sent directly to another computing device 410 at which the RNN execution model 414 is trained by an ML runtime 412. The RNN execution model 414, for example, can be a linear regression model, a neural network, multi-layer neural network, or any other type of model.

In an embodiment, a determination of an execution pattern can be made separately for each layer of the RNN. As an example, if an RNN is composed of five separate layers, a determination can be made to execute all five layers in a rolled or unrolled execution pattern or to execute some of the layers in a rolled execution pattern and other layers using an unrolled execution pattern.

In some embodiments, determination of an execution pattern can further include selecting various other RNN configuration parameters and hyperparameters. For example, if an RNN is used for natural language processing and the input data includes sentences, the system may include a parameter defining a number of words to ingest for each execution iteration. In this example, the number of words can be selected automatically by an ML runtime 102 based on information about the available computing devices to optimize execution of the RNN. As another example, various parameters that affect the structure of an RNN, such as a number of hidden layers to include in the RNN and so forth, can be automatically selected based on information about available computing resource capacity, the input data, and the like.

In some embodiments, a ML runtime 102 changes the execution pattern during execution of the RNN. For example, an ML runtime 102 may initially determine based on the available computing resources to execute an RNN using an unrolled execution pattern but later determine that memory resources are becoming scarce. In this example, the ML runtime 102 may switch to executing the RNN using a rolled execution pattern instead to conserve the available memory resources. Similarly, a ML runtime 102 may switch from a rolled execution pattern to an unrolled execution pattern in a scenario where more memory resources become available during execution than anticipated.

Figure 5:
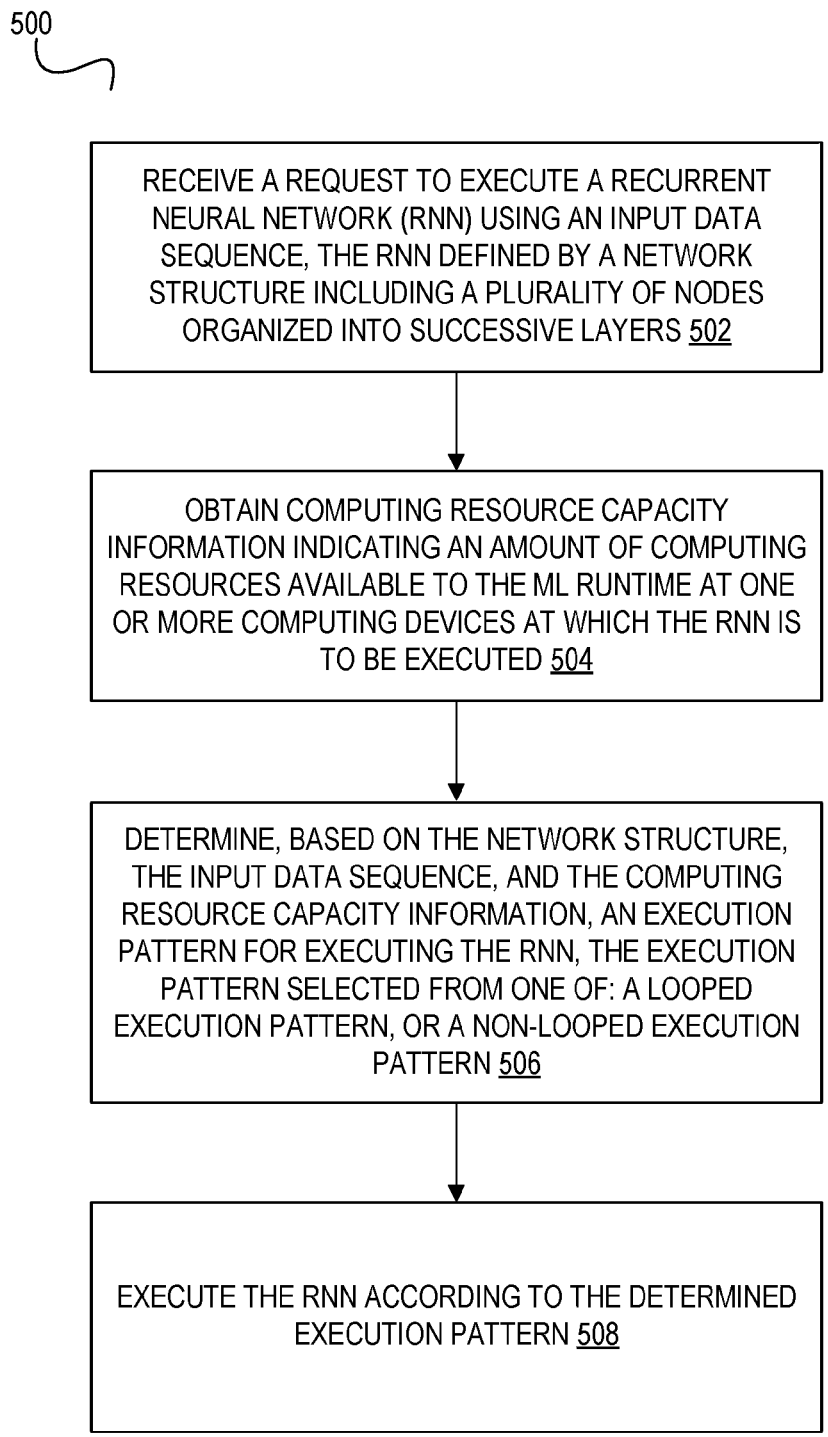
FIG. 5 is a flow diagram illustrating operations of a method for automatically determining recurrent neural network (RNN) configurations according to some embodiments.

FIG. 5 is a flow diagram illustrating operations 500 of a method for automatically determining one or more runtime configurations used to execute recurrent neural networks (RNNs) for training or inference according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a ML service 108 of the other figures.

The operations 500 include, at block 502, receiving a request to execute a RNN using an input data sequence, the RNN defined by a network structure including a plurality of nodes organized into successive layers. Referring to FIG. 1, for example, a training request 124 or inference request 128 can be received by one or more computing device(s) 126 of a ML service 108.

The operations 500 further include, at block 504, obtaining computing resource capacity information indicating an amount of computing resources available to the ML runtime at one or more computing devices at which the RNN is to be executed. For example, a computing device 126 at which the RNN is to be executed can obtain information indicating an amount of computing resources available to the ML runtime 102 in terms of CPU, GPU, or memory capacity, information about the type of hardware computing resources available, information about software running on the computing device(s), or combinations thereof.

The operations 500 further include, at block 506, determining, based on information related to some or all of the network structure, the input data sequence, and the computing resource capacity information, an execution pattern for executing the RNN, the execution pattern selected from one of: a rolled execution pattern, or an unrolled execution pattern. In an embodiment, the rolled execution pattern consumes less memory resources than the unrolled execution pattern, and the unrolled execution pattern executes faster than the rolled execution pattern.

In an embodiment, determining an execution pattern for executing the RNN is further based on information about the RNN network structure, the information including one or more of: a type of RNN, a number of nodes in the RNN, and a number of layers in the RNN. In an embodiment, the computing resource capacity information includes one or more of: available central processing unit (CPU) resources, available graphics processing unit (GPU) resources, and available memory resources. In an embodiment, determining an execution pattern for executing the RNN is further based on an amount of input data used to execute the RNN, characteristics of the input data, or combinations thereof. In an embodiment, determining the execution pattern includes using a separate ML model trained using data reflecting performance information for other RNN executions.

The operations 500 further include, at block 508, executing the RNN according to the determined execution pattern. In an embodiment, the request to execute the RNN is received by a ML service of a service provider network, and the RNN is executed at one or more computing devices of the service provider network. In other examples, the RNN is executed at any computing device capable of running a ML runtime.

In an embodiment, the execution pattern is changed during execution of the RNN. For example, during execution of the RNN, the ML runtime may determine that an amount of available computing resources has changed and that performance can be improved by switching from a rolled to an unrolled execution pattern, or vice versa.

In an embodiment, the request is received to execute the RNN by a ML service of a service provider network, and the request includes a parameter specifying whether to prioritize memory consumption or execution time during execution of the RNN. In this example, determining the execution pattern for executing the RNN is further based on the parameter specifying whether to prioritize memory consumption or execution time during execution of the RNN. In an embodiment, execution of the RNN can be used to train the RNN or to perform inference.

Figure 6:
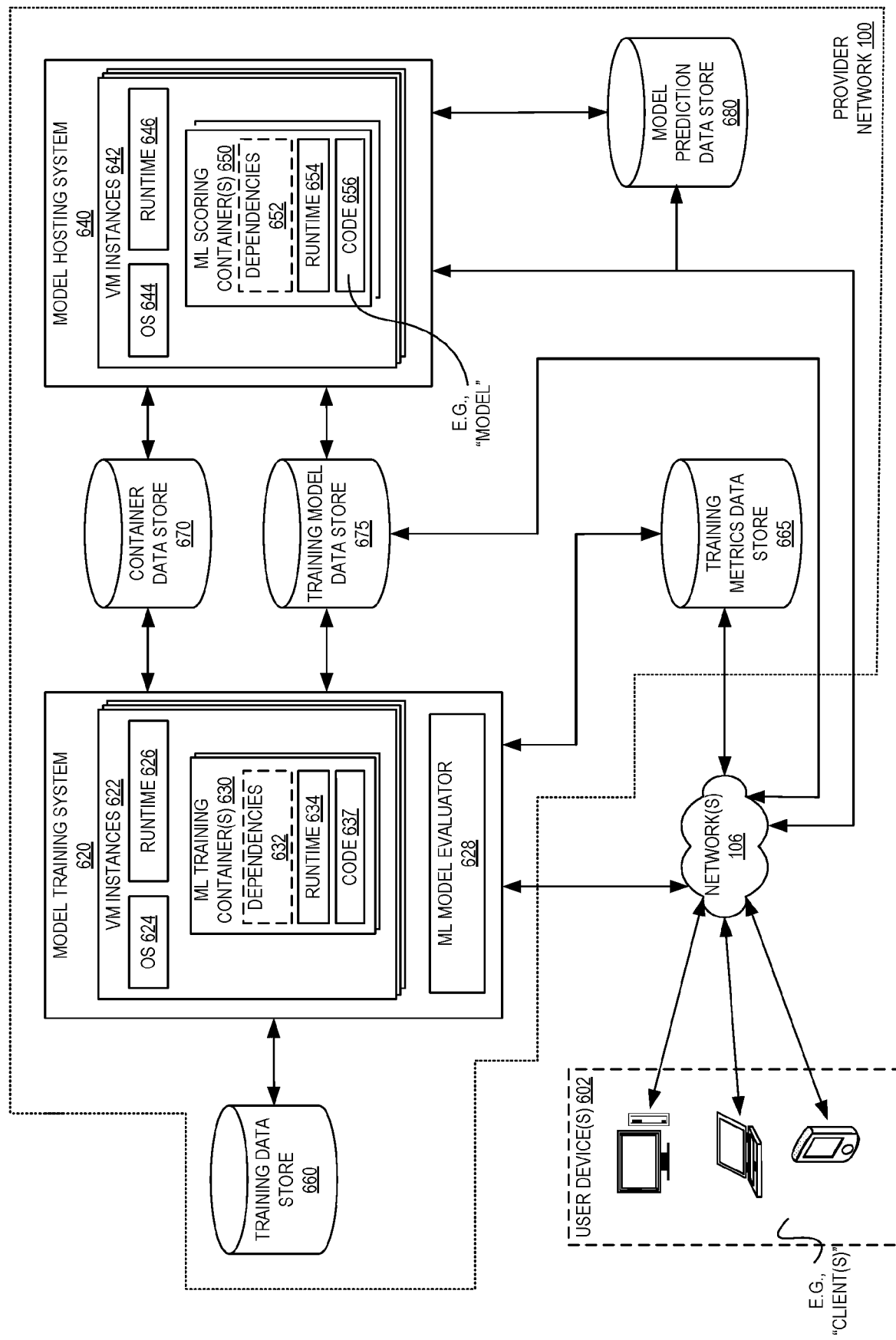
FIG. 6 is a block diagram of an illustrative operating environment in which machine learning models are trained and hosted according to some embodiments.

FIG. 6 is a block diagram of an illustrative operating environment in which machine learning models are trained and hosted according to some embodiments. The operating environment includes end user devices 602 (for example, electronic devices(s) 120), a model training system 620, a model hosting system 640, a training data store 660, a training metrics data store 665, a container data store 670, a training model data store 675, and a model prediction data store 680.

A machine learning service described herein may include one or more of these entities, such as the model hosting system 640, model training system 620, and so forth.

In some embodiments, users, by way of user devices 602, interact with the model training system 620 to provide data that causes the model training system 620 to train one or more machine learning models, for example, as described elsewhere herein. A machine learning model, generally, may be thought of as one or more equations that are "trained" using a set of data. In some embodiments, the model training system 620 provides ML functionalities as a web service, and thus messaging between user devices 602 and the model training system 620 (or provider network 100), and/or between components of the model training system 620 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 602 can interact with the model training system 620 via frontend 629 of the model training system 620. For example, a user device 602 can provide a training request to the frontend 629 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 602, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 602 may provide, in the training request, an algorithm written in any programming language. The model training system 620 then packages the algorithm into a container (optionally with other code, such as a "base" ML algorithm supplemented with user-provided code) that is eventually loaded into a virtual machine instance 622 for training a machine learning model, as described in greater detail below. For example, a user, via a user device 602, may develop an algorithm/code using an application (for example, an interactive web-based programming environment) and cause the algorithm/code to be provided - perhaps as part of a training request (or referenced in a training request) - to the model training system 620, where this algorithm/code may be containerized on its own or used together with an existing container having a machine learning framework, for example.

In some embodiments, instead of providing a container image in the training request, the user device 602 provides, in the training request, an indicator of a container image (for example, an indication of an address or a location at which a container image is stored). For example, the container image can be stored in a container data store 670, and this container image may have been previously created/uploaded by the user. The model training system 620 can retrieve the container image from the indicated location and create a container using the retrieved container image. The container is then loaded into a virtual machine instance 622 for training a machine learning model, as described in greater detail below.

The model training system 620 can use the information provided by the user device 602 to train a machine learning model in one or more pre-established virtual machine instances 622 in some embodiments. In particular, the model training system 620 includes a single physical computing device or multiple physical computing devices that are interconnected using one or more computing networks (not shown), where the physical computing device(s) host one or more virtual machine instances 622. The model training system 620 can handle the acquisition and configuration of compute capacity (for example, containers, instances, etc., which are described in greater detail below) based on the information describing the computing machine on which to train a machine learning model provided by the user device 602. The model training system 620 can then train machine learning models using the compute capacity, as is described in greater detail below. The model training system 620 can automatically scale up and down based on the volume of training requests received from user devices 602 via frontend 629, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance and can be utilized to isolate execution of a task from other processes (for example, task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (for example, creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 637, and dependencies 632 needed by the code 637 in some embodiments. The runtime 634 can be defined by one or more executable instructions that form at least a portion of a container image that is used to form the ML training container 630 (for example, the executable instruction(s) in the container image that define the operating system and/or runtime to run in the container formed from the container image). The code 637 includes one or more executable instructions that form at least a portion of a container image that is used to form the ML training container 630. For example, the code 637 includes the executable instructions in the container image that represent an algorithm that defines a machine learning model, which may reference (or utilize) code or libraries from dependencies 632. The runtime 634 is configured to execute the code 637 in response to an instruction to begin machine learning model training. Execution of the code 637 results in the generation of model data, as described in greater detail below.

In some embodiments, the code 637 includes executable instructions that represent algorithms that define different machine learning models. For example, the code 637 includes one set of executable instructions that represent a first algorithm that defines a first machine learning model and a second set of executable instructions that represent a second algorithm that defines a second machine learning model. In some embodiments, the virtual machine instance 622 executes the code 637 and trains all of the machine learning models. In some embodiments, the virtual machine instance 622 executes the code 637, selecting one of the machine learning models to train. For example, the virtual machine instance 622 can identify a type of training data indicated by the training request and select a machine learning model to train (for example, execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 620 uses one or more container images included in a training request (or a container image retrieved from the container data store 670 in response to a received training request) to create and initialize a ML training container 630 in a virtual machine instance 622. For example, the model training system 620 creates a ML training container 630 that includes the container image(s) and/or a top container layer.

Prior to beginning the training process, in some embodiments, the model training system 620 retrieves training data from the location indicated in the training request. For example, the location indicated in the training request can be a location in the training data store 660. Thus, the model training system 620 retrieves the training data from the indicated location in the training data store 660. In some embodiments, the model training system 620 does not retrieve the training data prior to beginning the training process. Rather, the model training system 620 streams the training data from the indicated location during the training process. For example, the model training system 620 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (for example, a buffer storing the retrieved portion is nearly empty), then the model training system 620 can retrieve a second portion of the training data and provide the second retrieved portion to the virtual machine instance 622, and so on.

To perform the machine learning model training, the virtual machine instance 622 executes code 637 stored in the ML training container 630 in some embodiments. For example, the code 637 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (for example, coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 620 as input parameters to some or all of the instructions being executed.

In some embodiments, executing the executable instructions causes the virtual machine instance 622 (for example, the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 620 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user device 602 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 675.

In some embodiments, a virtual machine instance 622 executes code 637 stored in a plurality of ML training containers 630. For example, the algorithm included in the container image can be in a format that allows for the parallelization of the training process. Thus, the model training system 620 can create multiple copies of the container image provided in a training request and cause the virtual machine instance 622 to load each container image copy in a separate ML training container 630. The virtual machine instance 622 can then execute, in parallel, the code 637 stored in the ML training containers 630. The virtual machine instance 622 can further provide configuration information to each ML training container 630 (for example, information indicating that N ML training containers 630 are collectively training a machine learning model and that a particular ML training container 630 receiving the configuration information is ML training container 630 number X of N), which can be included in the resulting model data. By parallelizing the training process, the model training system 620 can significantly reduce the training time in some embodiments.

In some embodiments, a plurality of virtual machine instances 622 execute code 637 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 620 can create multiple copies of the container image provided in a training request, initialize multiple virtual machine instances 622, and cause each virtual machine instance 622 to load a container image copy in one or more separate ML training containers 630. The virtual machine instances 622 can then each execute the code 637 stored in the ML training containers 630 in parallel. The model training system 620 can further provide configuration information to each ML training container 630 via the virtual machine instances 622 (for example, information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 620 can significantly reduce the training time in some embodiments.

In some embodiments, the model training system 620 includes a plurality of physical computing devices and two or more of the physical computing devices hosts one or more virtual machine instances 622 that execute the code 637. Thus, the parallelization can occur over different physical computing devices in addition to over different virtual machine instances 622 and/or ML training containers 630.

In some embodiments, the model training system 620 includes a ML model evaluator 628. The ML model evaluator 628 can monitor virtual machine instances 622 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (for example, known results), and thus the ML model evaluator 628 can define a machine learning model using the model data and execute the machine learning model by providing the input data as inputs to the machine learning model. The ML model evaluator 628 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user device 602, can access and retrieve the model metrics from the training metrics data store 665. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 602, can transmit a request to the model training system 620 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 620 can modify the machine learning model accordingly. For example, the model training system 620 can cause the virtual machine instance 622 to optionally delete an existing ML training container 630, create and initialize a new ML training container 630 using some or all of the information included in the request, and execute the code 637 stored in the new ML training container 630 to restart the machine learning model training process. As another example, the model training system 620 can cause the virtual machine instance 622 to modify the execution of code stored in an existing ML training container 630 according to the data provided in the modification request. In some embodiments, the user, via the user device 602, can transmit a request to the model training system 620 to stop the machine learning model training process. The model training system 620 can then instruct the virtual machine instance 622 to delete the ML training container 630 and/or to delete any model data stored in the training model data store 675.

As described below, in some embodiments, the model data stored in the training model data store 675 is used by the model hosting system 640 to deploy machine learning models. Alternatively or additionally, a user device 602 or another computing device (not shown) can retrieve the model data from the training model data store 675 to implement a learning algorithm in an external device. As an illustrative example, a robotic device can include sensors to capture input data. A user device 602 can retrieve the model data from the training model data store 675 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (for example, rapid initialization of machine learning model training in ML training container(s) 630) in response to training requests.

In some embodiments, the model training system 620 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 602, the model hosting system 640, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 640 includes a single physical computing device or multiple physical computing devices that are interconnected using one or more computing networks (not shown), where the physical computing device(s) host one or more virtual machine instances 642. The model hosting system 640 can handle the acquisition and configuration of compute capacity (for example, containers, instances, etc.) based on demand for the execution of trained machine learning models. The model hosting system 640 can then execute machine learning models using the compute capacity, as is described in greater detail below. The model hosting system 640 can automatically scale up and down based on the volume of execution requests received from user devices 602 via frontend 649 of the model hosting system 640, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance and can be utilized to isolate execution of a task from other processes (for example, task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (for example, creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (for example, supporting software such as libraries) needed by the code 656 in some embodiments. The runtime 654 can be defined by one or more executable instructions that form at least a portion of a container image that is used to form the ML scoring container 650 (for example, the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (for example, predicted results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 640 uses one or more container images included in a deployment request (or a container image retrieved from the container data store 670 in response to a received deployment request) to create and initialize a ML scoring container 650 in a virtual machine instance 642. For example, the model hosting system 640 creates a ML scoring container 650 that includes the container image(s) and/or a top container layer.

As described above, a user device 602 can submit a deployment request and/or an execution request to the model hosting system 640 via the frontend 649 in some embodiments. A deployment request causes the model hosting system 640 to deploy a trained machine learning model into a virtual machine instance 642. For example, the deployment request can include an identification of an endpoint (for example, an endpoint name, such as an HTTP endpoint name) and an identification of one or more trained machine learning models (for example, a location of one or more model data files stored in the training model data store 675). Optionally, the deployment request also includes an identification of one or more container images stored in the container data store 670.

Upon receiving the deployment request, the model hosting system 640 initializes ones or more ML scoring containers 650 in one or more hosted virtual machine instance 642. In embodiments in which the deployment request includes an identification of one or more container images, the model hosting system 640 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 640 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 640 further forms the ML scoring container(s) 650 by retrieving model data corresponding to the identified trained machine learning model(s) in some embodiments. For example, the deployment request can identify a location of model data file(s) stored in the training model data store 675. In embodiments in which a single model data file is identified in the deployment request, the model hosting system 640 retrieves the identified model data file from the training model data store 675 and inserts the model data file into a single ML scoring container 650, which forms a portion of code 656. In some embodiments, the model data file is archived or compressed (for example, formed from a package of individual files). Thus, the model hosting system 640 unarchives or decompresses the model data file to obtain multiple individual files and inserts the individual files into the ML scoring container 650. In some embodiments, the model hosting system 640 stores the model data file in the same location as the location in which the model data file was stored in the ML training container 630 that generated the model data file. For example, the model data file initially was stored in the top container layer of the ML training container 630 at a certain offset, and the model hosting system 640 then stores the model data file in the top container layer of the ML scoring container 650 at the same offset.

In embodiments in which multiple model data files are identified in the deployment request, the model hosting system 640 retrieves the identified model data files from the training model data store 675. The model hosting system 640 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 640 associates the initialized ML scoring container(s) 650 with the endpoint identified in the deployment request. For example, each of the initialized ML scoring container(s) 650 can be associated with a network address. The model hosting system 640 can map the network address(es) to the identified endpoint, and the model hosting system 640 or another system (for example, a routing system, not shown) can store the mapping. Thus, a user device 602 can refer to trained machine learning model(s) stored in the ML scoring container(s) 650 using the endpoint. This allows for the network address of an ML scoring container 650 to change without causing the user operating the user device 602 to change the way in which the user refers to a trained machine learning model.

Once the ML scoring container(s) 650 are initialized, the ML scoring container(s) 650 are ready to execute trained machine learning model(s). In some embodiments, the user device 602 transmits an execution request to the model hosting system 640 via the frontend 649, where the execution request identifies an endpoint and includes an input to a machine learning model (for example, a set of input data). The model hosting system 640 or another system (for example, a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 640 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively or in addition, the virtual machine instance 642 transmits the output to the user device 602 that submitted the execution result via the frontend 649.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 602 via the frontend 649 (for example, if no more trained machine learning models are needed to generate an output) or transmit the second output to a third ML scoring container 650 initialized in the same or different virtual machine instance 642 (for example, if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (for example, rapid initialization of ML scoring container(s) 650, rapid execution of code 656 in ML scoring container(s), etc.) in response to deployment and/or execution requests.

In some embodiments, the model hosting system 640 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 602, the model training system 620, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 620 and the model hosting system 640 depicted in FIG. 6 are not meant to be limiting. For example, the model training system 620 and/or the model hosting system 640 could also operate within a computing environment having a fewer or greater number of devices than are illustrated in FIG. 6. Thus, the depiction of the model training system 620 and/or the model hosting system 640 in FIG. 6 may be taken as illustrative and not limiting to the present disclosure. For example, the model training system 620 and/or the model hosting system 640 or various constituents thereof could implement various web services components, hosted or "cloud" computing environments, and/or peer-to-peer network configurations to implement at least a portion of the processes described herein. In some embodiments, the model training system 620 and/or the model hosting system 640 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 602 and provisions virtual machine instances 622. In some embodiments, the frontend 629 serves as a front door to all the other services provided by the model training system 620. The frontend 629 processes the requests and makes sure that the requests are properly authorized. For example, the frontend 629 may determine whether the user associated with the training request is authorized to initiate the training process.

Similarly, frontend 649 processes all deployment and execution requests received from user devices 602 and provisions virtual machine instances 642. In some embodiments, the frontend 649 serves as a front door to all the other services provided by the model hosting system 640. The frontend 649 processes the requests and makes sure that the requests are properly authorized. For example, the frontend 649 may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 620 and the model hosting system 640, this is not meant to be limiting. For example, in some embodiments not shown, the training data store 660 is located internal to at least one of the model training system 620 or the model hosting system 640.

In some embodiments, the training metrics data store 665 stores model metrics. While the training metrics data store 665 is depicted as being located external to the model training system 620 and the model hosting system 640, this is not meant to be limiting. For example, in some embodiments not shown, the training metrics data store 665 is located internal to at least one of the model training system 620 or the model hosting system 640.

The container data store 670 stores container images, such as container images used to form ML training containers 630 and/or ML scoring containers 650, that can be retrieved by various virtual machine instances 622 and/or 642. While the container data store 670 is depicted as being located external to the model training system 620 and the model hosting system 640, this is not meant to be limiting. For example, in some embodiments not shown, the container data store 670 is located internal to at least one of the model training system 620 and the model hosting system 640.

The training model data store 675 stores model data files. In some embodiments, some of the model data files are comprised of a single file, while other model data files are packages of multiple individual files. While the training model data store 675 is depicted as being located external to the model training system 620 and the model hosting system 640, this is not meant to be limiting. For example, in some embodiments not shown, the training model data store 675 is located internal to at least one of the model training system 620 or the model hosting system 640.

The model prediction data store 680 stores outputs (for example, execution results) generated by the ML scoring containers 650 in some embodiments. While the model prediction data store 680 is depicted as being located external to the model training system 620 and the model hosting system 640, this is not meant to be limiting. For example, in some embodiments not shown, the model prediction data store 680 is located internal to at least one of the model training system 620 and the model hosting system 640.

While the model training system 620, the model hosting system 640, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 602 via the one or more network(s) 106.

Various example user devices 602 are shown in FIG. 6, including a desktop computer, laptop, and a mobile phone, each provided by way of illustration. In general, the user devices 602 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 620 and/or the model hosting system 640 provides the user devices 602 with one or more user interfaces, command-line interfaces (CLI), application programing interfaces (API), and/or other programmatic interfaces for submitting training requests, deployment requests, and/or execution requests. In some embodiments, the user devices 602 can execute a stand-alone application that interacts with the model training system 620 and/or the model hosting system 640 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
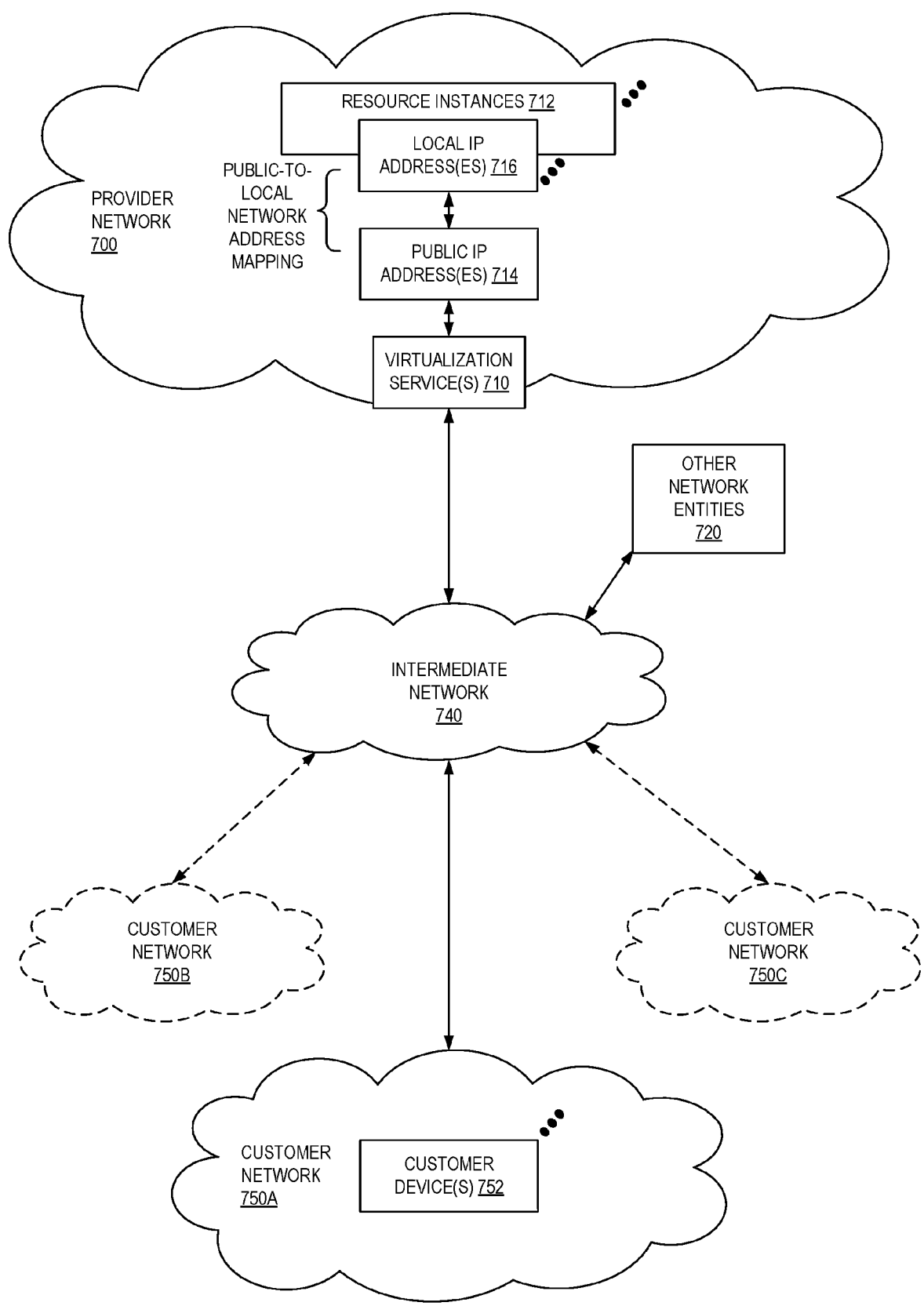
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
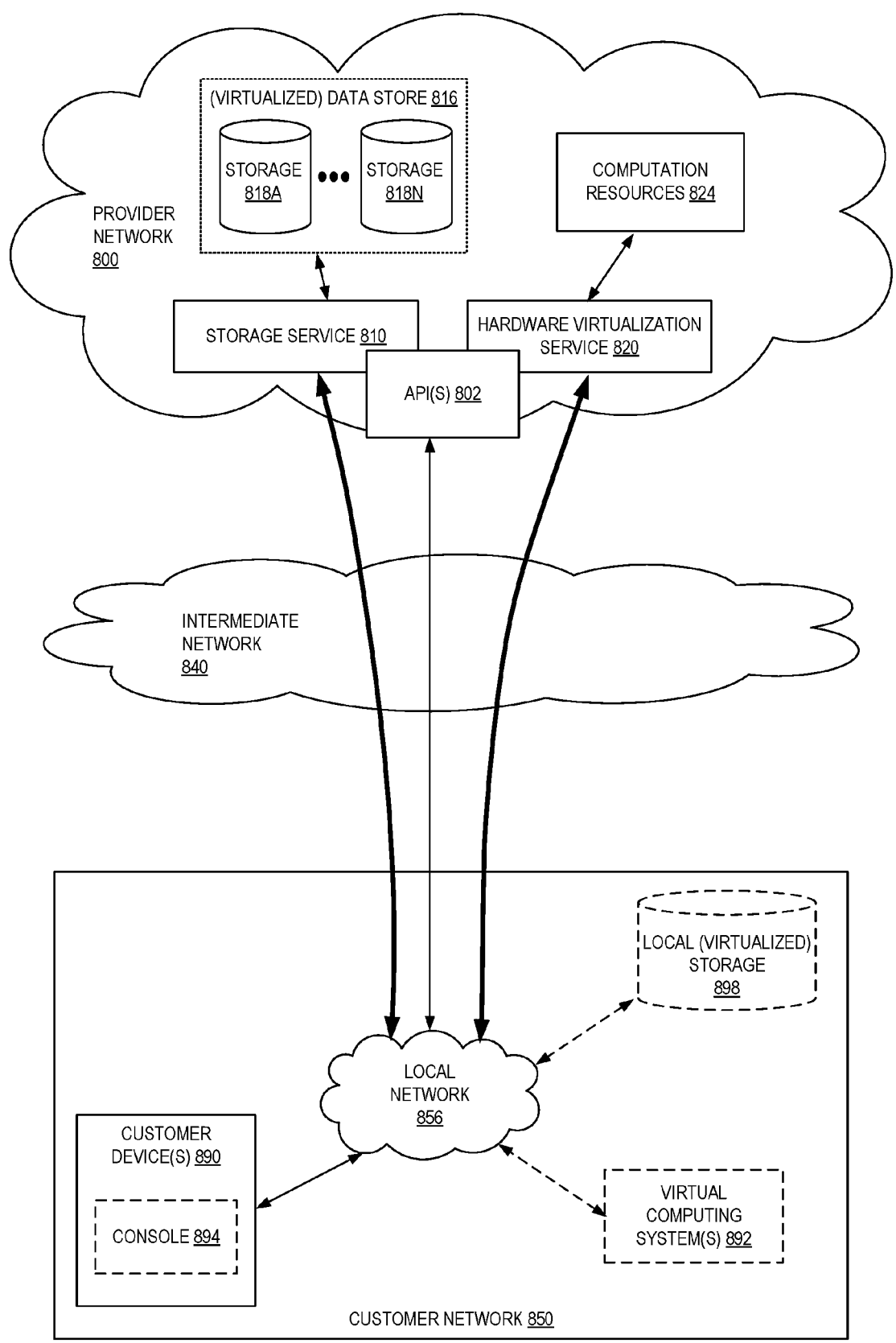
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
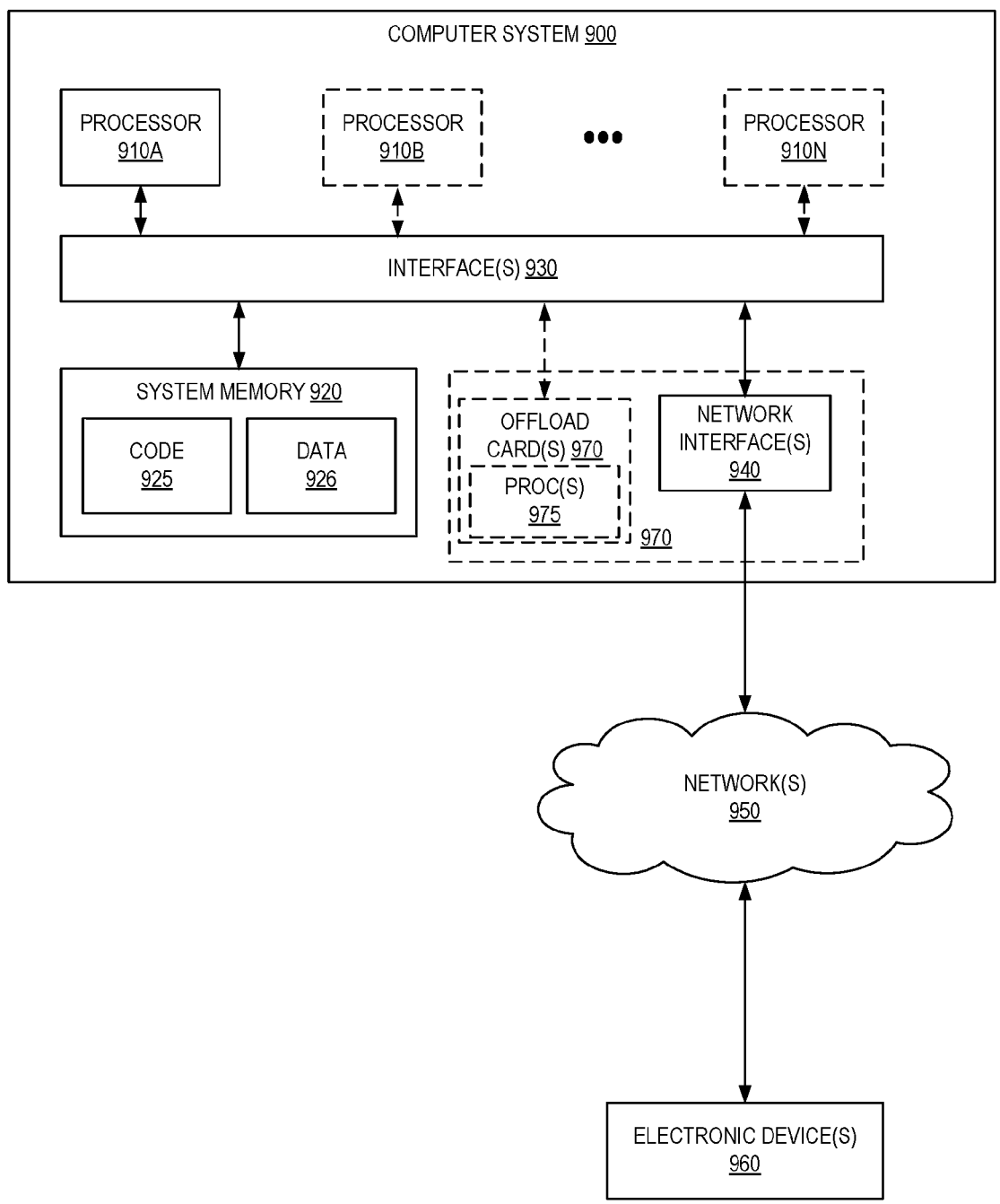
FIG. 9 is a block diagram illustrating an example computer system that may be used in some embodiments.

In some embodiments, a system that implements a portion or all of the techniques for automatically determining recurrent neural network (RNN) configurations as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect – Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method performed by a machine learning (ML) runtime, the method comprising:
    receiving a request to execute a recurrent neural network (RNN) using an input data sequence, the RNN defined by a network structure including a plurality of nodes organized into successive layers;
    obtaining computing resource capacity information indicating an amount of computing resources available to the ML runtime at one or more computing devices at which the RNN is to be executed;
    determining, using a separate ML model trained using RNN execution performance data in combination with information about whether the execution was performed using a rolled execution pattern or an unrolled execution pattern, and based on the network structure, the input data sequence, and the computing resource capacity information, an execution pattern for executing the RNN, the execution pattern selected from one of: a rolled execution pattern or an unrolled execution pattern; and
    executing the RNN according to the execution pattern.

2. The computer-implemented method of claim 1, wherein the rolled execution pattern consumes less memory resources than the unrolled execution pattern, and wherein the unrolled execution pattern executes faster than the rolled execution pattern.

3. The computer-implemented method of claim 1, wherein the RNN is defined by a network structure including a plurality of nodes organized into successive layers, and wherein the method further comprises separately determining, for each layer of the successive layers, a respective execution pattern for the layer, the respective execution pattern selected from one of: the rolled execution pattern or the unrolled execution pattern.

4. A computer-implemented method comprising:
    obtaining computing resource capacity information indicating an amount of computing resources available at a computing device at which a recurrent neural network (RNN) is to be executed using an input data sequence;
    determining, using a separate ML model trained using RNN execution performance data in combination with information about whether the execution was performed using a rolled execution pattern or an unrolled execution pattern, and based on the computing resource capacity information, an execution pattern for executing the RNN, the execution pattern selected from one of: a rolled execution pattern or an unrolled execution pattern; and executing the RNN according to the execution pattern.

5. The computer-implemented method of claim 4, wherein the rolled execution pattern consumes less memory resources than the unrolled execution pattern, and wherein the unrolled execution pattern executes faster than the rolled execution pattern.

6. The computer-implemented method of claim 4, further comprising:
receiving, by a ML service of a service provider network, a request to execute the RNN; and
executing the RNN at one or more computing devices of the service provider network.

7. The computer-implemented method of claim 4, wherein determining an execution pattern for executing the RNN is further based on information describing the RNN's network structure, the information including one or more of: a type of RNN, a number of nodes in the RNN, and a number of layers in the RNN; and
wherein the type of RNN is one of a fully recurrent network, a recursive neural network, a long short-term memory (LSTM) network, a gated recurrent unit (GRU) network, and a bidirectional RNN, a continuous time RNN (CTRNN), a hierarchical RNN, or a recurrent multilayer perceptron network.

8. The computer-implemented method of claim 4, wherein the computing resource capacity information includes one or more of: available central processing unit (CPU) resources, available graphics processing unit (GPU) resources, and available memory resources.

9. The computer-implemented method of claim 4, wherein determining an execution pattern for executing the RNN is further based on one or more of: an amount of input data used to execute the RNN, and one or more data types associated with the input data.

10. The computer-implemented method of claim 4, wherein the RNN is defined by a network structure including a plurality of nodes organized into successive layers, and wherein data representing the network structure is stored at a storage location accessible to the computing device at which the RNN is to be executed.

11. The computer-implemented method of claim 4, wherein the RNN is defined by a network structure including a plurality of nodes organized into successive layers, and the method further comprising separately determining, for each layer of the successive layers, a respective execution pattern for the layer, the respective execution pattern selected from one of: the rolled execution pattern, or the unrolled execution pattern.

12. The computer-implemented method of claim 4, further comprising:
receiving, by a ML service of a service provider network, a request to execute the RNN, the request including a parameter specifying whether to prioritize memory consumption or execution time during execution of the RNN; and
wherein determining the execution pattern for executing the RNN is further based on the parameter specifying whether to prioritize memory consumption or execution time during execution of the RNN.

13. The computer-implemented method of claim 4, wherein execution of the RNN can be used to train the RNN or to perform inference.

14. A system comprising:
a frontend implemented by a first one or more electronic devices of a provider network, the front end including instructions that upon execution cause the frontend to:
receive a request to execute a recurrent neural network (RNN) using an input data sequence, the RNN defined by a network structure including a plurality of nodes organized into successive layers, and
send the request to a machine learning (ML) service of the provider network; and
the ML service implemented by a second one or more electronic devices, the ML service including instructions that upon execution cause the ML service to:
obtain computing resource capacity information indicating an amount of computing resources available to a ML runtime at one or more computing devices at which the RNN is to be executed;
determine, using a separate ML model trained using RNN execution performance data in combination with information about whether the execution was performed using a rolled execution pattern or an unrolled execution pattern, and based on the network structure, the input data sequence, and the computing resource capacity information, an execution pattern for executing the RNN, the execution pattern selected from one of: a rolled execution pattern or an unrolled execution pattern; and
execute the RNN according to the execution pattern.

15. The system of claim 14, wherein the rolled execution pattern consumes less memory resources than the unrolled execution pattern, and wherein the unrolled execution pattern executes faster than the rolled execution pattern.

16. The system of claim 14, wherein the RNN is defined by a network structure including a plurality of nodes organized into successive layers, and wherein the ML service includes further instructions that upon execution further cause the ML service to separately determine, for each layer of the successive layers, a respective execution pattern for the layer, the respective execution pattern selected from one of: the rolled execution pattern or the unrolled execution pattern.

17. The system of claim 14, wherein determining an execution pattern for executing the RNN is further based on information describing the RNN's network structure, the information including one or more of: a type of RNN, a number of nodes in the RNN, and a number of layers in the RNN; and
wherein the type of RNN is one of a fully recurrent network, a recursive neural network, a long short-term memory (LSTM) network, a gated recurrent unit (GRU) network, and a bidirectional RNN, a continuous time RNN (CTRNN), a hierarchical RNN, or a recurrent multilayer perceptron network.

18. The system of claim 14, wherein the computing resource capacity information includes one or more of: available central processing unit (CPU) resources, available graphics processing unit (GPU) resources, and available memory resources.

19. The system of claim 14, wherein determining an execution pattern for executing the RNN is further based on one or more of: an amount of input data used to execute the RNN, and one or more data types associated with the input data.

20. The system of claim 14, wherein the ML service includes further instructions that upon execution further cause the ML service to receive a request to execute the RNN, the request including a parameter specifying whether to prioritize memory consumption or execution time during execution of the RNN, wherein determining the execution pattern for executing the RNN is further based on the parameter specifying whether to prioritize memory consumption or execution time during execution of the RNN.

* * * * *